United States Patent Office 3,076,793
Patented Feb. 5, 1963

3,076,793
PROCESS FOR THE PRODUCTION OF COPOLYMERS CONTAINING HYDROXYL GROUPS
Erwin Heinrich, Fritz Derichs, and Franz Broich, Marl, Kreis Recklinghausen, Germany, assignors to Chemische Werke Huls Aktiengesellschaft, Marl, Kreis Recklinghausen, Germany, a corporation of Germany
No Drawing. Filed Dec. 19, 1960, Ser. No. 76,481
Claims priority, application Germany Jan. 7, 1960
5 Claims. (Cl. 260—80.5)

It is known that copolymers containing hydroxyl groups can be made from vinyl chloride and vinyl acetate if the copolymers are partially saponified in solution or suspension with acids or alkalies. This process involves the use of about 3 volumes of solvent or suspending medium per 1 volume of the copolymer. The polymer is recovered after neutralization of unconsumed acid by the addition of methanol until all of the polymer precipitates. The recovery of the solvent and the precipitant is very expensive.

It has been found that technically valuable copolymers containing hydroxyl groups can be obtained by the copolymerization of vinyl chloride and vinyl acetate with 2-oxymethyl-1,4-endo-methylene-cyclohexene-(5). In the tripolymer the vinyl chloride may be within the range from 51 to 94%, preferably 80 to 91%, the vinyl acetate within the range from 16 to 2%, preferably 7 to 3% and the 2-oxymethyl-1,4-endo-methylene-cyclohexane-(5) within the range from 33 to 4% preferably 13 to 6%.

The polymerization is carried out in the known manner, for example, in emulsion with from 1 to 10% by weight, calculated upon the combined weights of the monomers of one or more emulsifying agents such as alkyl or aralkyl sulfonic acid salts, alkyl sulfuric acid salts, fatty acid salts or aryl fatty acid salts. The ratio of organic phase to aqueous phase may vary within the range from 1 to 1 to 1 to 5, preferably within the range from 1 to 1.5 to 1 to 2. From 0.1 to 5% by weight, calculated upon the weight of the monomers of a water-soluble, radical-yielding compound or mixture such as potassium persulfate, hydrogen peroxide or the known so-called redox system is used as polymerization activator. It is also possible to polymerize in aqueous suspensions with the use of hydrophilic colloids.

The polymers in the form of their solutions are useful as lacquers which are especially compatible with the modified alkyd resins known under the trade name of "Alkydales."

The invention is illustrated by the following example.

180 parts by weight of sodium alkyl sulfonate having from 12–14 carbon atoms is dissolved in 18,000 parts by weight of water in a pressure resistant polymerization vessel. To the resulting solution are added 520 parts by weight of 2-oxymethyl-1,4-endo-methylene-cyclohexene-(5), 260 parts by weight of vinyl acetate, 36 parts by weight of potassium persulfate and 18 parts by weight of sodium pyrophosphate. The vessel is then flushed with nitrogen and evacuated and then 5220 parts by weight of gaseous vinyl chloride are pressed in. The contents of the vessel are polymerized with moderate stirring at 50° C. until the pressure starts to decrease and the vessel and contents are then cooled and the pressure relieved. The resulting emulsion is mixed with a 5% sodium chloride solution in 1 to 1 ratio and the mixture warmed slightly. The so-precipitated polymerizate is separated by filtration, washed free of chlorine with salt-free water and dried at 80° C. The result is a white powder having a K value of 33.9. Its composition corresponds to 87% vinyl chloride, 5% vinyl acetate and 8% of the 2-oxymethyl-1,4-endo-methylene-cyclohexene-(5).

If blended with modified alkyd resins known under the trade name of "Alkydales," the copolymer containing hydroxyl groups may be used for ship's paints as a 20 to 25% solution in ketone.

We claim:
1. Process for the production of a hydroxyl group-containing copolymer which comprises polymerizing a mixture of vinyl chloride, vinyl acetate and 2-oxymethyl-1,4-endo-methylene-cyclohexene-(5).
2. Process as defined in claim 1 in which the vinyl chloride, vinyl acetate and 2-oxymethyl-1,4-endo-methylene-cyclohexene-(5) are in the ratio of from 51 to 94% of vinyl chloride, 16 to 2% of vinyl acetate and 33 to 4% of endomethylene tetrahydrobenzyl alcohol.
3. Process as defined in claim 1 in which the vinyl chloride, vinyl acetate and 2-oxymethyl-1,4-endo-methylene-cyclohexene-(5) are in the ratio of from 80 to 91% of vinyl chloride, 7 to 3% of vinyl acetate and 13 to 6% of endomethylene tetrahydrobenzyl alcohol.
4. Process as defined in claim 1 in which the polymerization is carried out in an aqueous medium in the presence of an emulsifying agent.
5. As a new product a hydroxyl group containing copolymer of from 51 to 94% of vinyl chloride, from 16 to 2% of vinyl acetate and from 33 to 4% of 2-oxymethyl-1,4-endo-methylene-cyclohexene-(5).

References Cited in the file of this patent
UNITED STATES PATENTS
2,352,606    Alder et al. _____ July 4, 1944